Sept. 2, 1969   S. E. SUMMERS   3,464,585
PRESSURE RELIEF VALVE
Filed Feb. 8, 1968   2 Sheets-Sheet 1
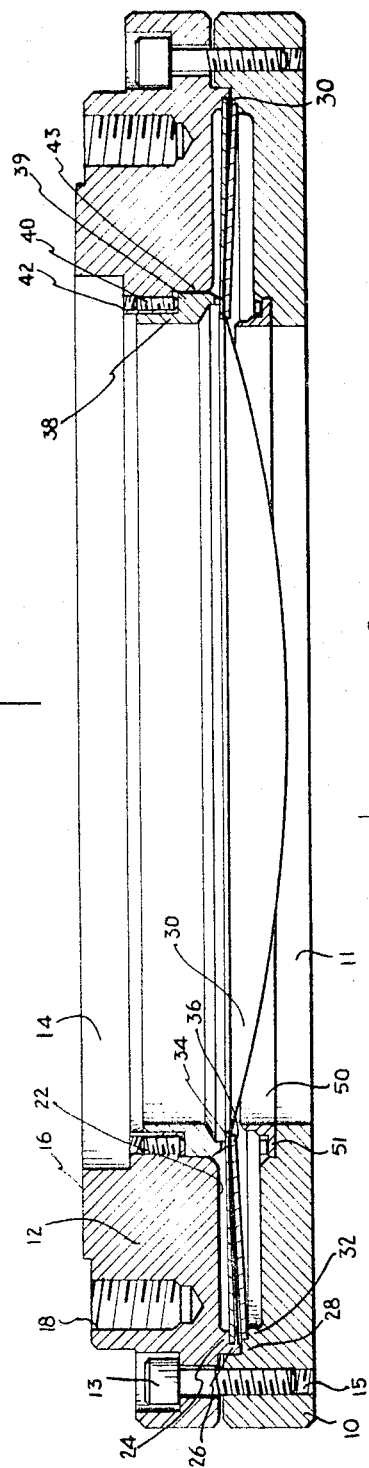
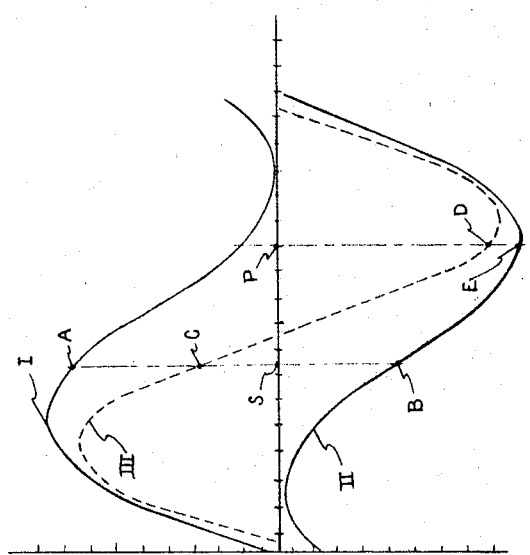
INVENTOR.
STANLEY E. SUMMERS
BY
*Robert S. Shaw*
ATTORNEY

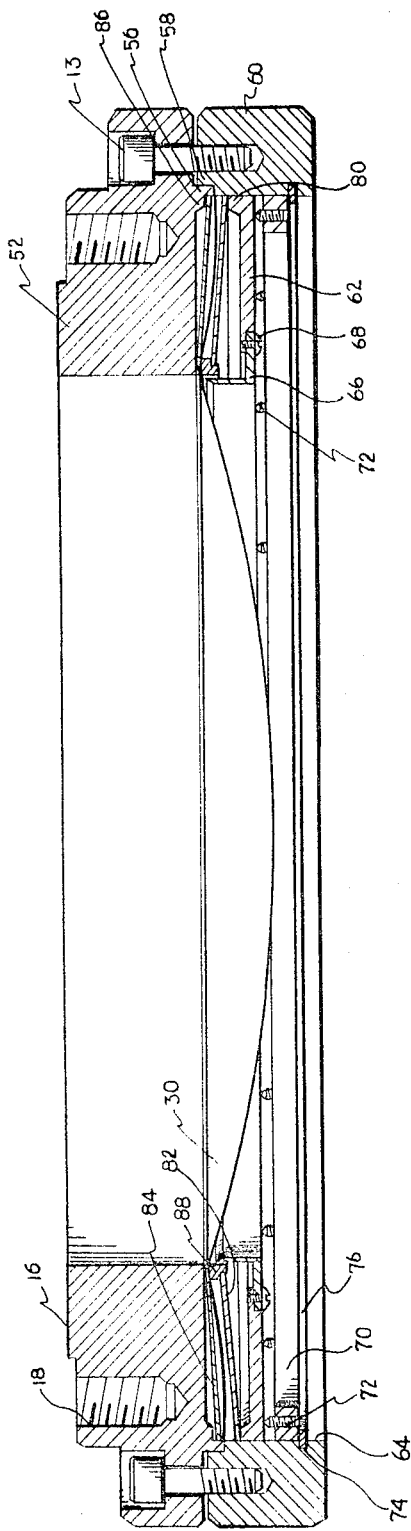

United States Patent Office 3,464,585
Patented Sept. 2, 1969

3,464,585
PRESSURE RELIEF VALVE
Stanley E. Summers, Woodland Hills, Calif., assignor to Ametek, Inc., New York, N.Y., a corporation of Delaware
Filed Feb. 8, 1968, Ser. No. 703,976
Int. Cl. B65d 45/00
U.S. Cl. 220—89          10 Claims

ABSTRACT OF THE DISCLOSURE

A pressure relief valve ideally suited for use in low pressure systems which employs a rupturable diaphragm supported opposite a diaphragm punch by a Belleville washer which is adapted, upon actuation, to snap over center and release the diaphragm into engagement with the punch and which also employs a second Belleville washer mounted upstream of the diaphragm and adapted, upon actuation, to thrust the diaphragm into the punch. The combination of a supporting Belleville and a rupture thrusting Belleville provides a relief valve with a snap action for systems having insufficient pressure to insure rupture of the diaphragm by utilizing the thrust release of the second Belleville to aid the rupture of the diaphragm.

---

This invention relates to pressure responsive devices which employ rupturable diaphragms and, in particular, relates to pressure relief valves operable for low to subatmospheric systems.

Pressure rupturable diaphragms have been employed in relief valves; however, they have generally not been precision devices because of the variations in the quality of the diaphragms. Recent improvements such as shown in prior Patents Re. 26,102 and 3,330,440 have improved the sensitivity of these valves by the use of resilient members such as a Belleville washer to support the diaphragm away from a diaphragm punch. The supporting Belleville is operative, upon actuation, to snap over center and permit the system pressure to impale the diaphragm on the punch.

The aforementioned devices comprise a substantial improvement in the construction of relief valves and provide valves with a high sensitivity to small pressure surges in a system.

The rupture of the diaphragm in these valves, however, depends on the force of the system pressure to rupture the diaphragm. Consequently, these valves are not entirely well suited for pressure relief in systems where the system pressure is too low to insure that adequate force will be available to rupture the diaphragm on the punch. Such applications are encountered, for example, with subatmospheric systems or with low gauge pressure systems. The problem is intensified in systems that require small relief flow areas where very large effective diaphragm areas are required to provide sufficient punching force from the pressure alone. In these applications, the system pressure is often inadequate to shear the diaphragm against the punch.

It is an object of this invention to provide a pressure responsive device with a rupturable diaphragm that can be used for very low pressure relief devices.

It is also an object of this invention to provide such pressure responsive devices with highly sensitive snap over action to insure precision of actuation.

It is an additional object of this invention to provide such pressure responsive devices with adjustable means to permit variation of the actuation pressure.

Other and related objects of this invention will be apparent from the following description of the invention.

The preceding objects are secured by the device of my invention which utilizes a snap over member to thrust the diaphragm into a diaphragm rupturing means. In a typical embodiment, the invention is a pressure relief valve with a rupturable diaphragm supported opposite a punch means by a resilient snap over member with a second resilient snap over member mounted upstream of the diaphragm and adapted, upon actuation, to thrust the diaphragm into the punch means. Preferably, Belleville washers are used as the snap over members with the rupture thrusting member as a Belleville washer that is reversed over center.

The invention will now be described by reference to the figures, of which:

FIGURE 1 is a cross sectional view of a valve according to the invention;

FIGURE 2 is the force-displacement curve of the snap over members of the valve of FIGURE 1; and FIGURE 3 illustrates an alternative valve construction.

Referring now to FIGURE 1, the pressure responsive valve is shown in cross section as a housing formed by body 10 assembled on flange 12 with cap screws 13 which engage threaded taps 15 about the outer periphery of the body 10. The assembly has an upstream pressure inlet, bore 14, which is exposed to the high pressure side of diaphragm 30. Body 10 has a similar bore 11 on the opposite side of the diaphragm and this serves as the outlet from the housing.

Flange 12 is provided with means for attachment to the high pressure system; as shown; a conventional raised flange face 16 and peripherally disposed tapped bores 18.

The housing defines an annular interior chamber formed by the undersurface 22 of flange 12 which is surrounded by the stepped rim 24 having an annular shoulder 26. Rim 24 seats against an annular recess 28 cut into the upper surface of body 10 which is also provided with an annular chamber for mounting of the diaphragm and the supporting, resilient snap over member 36.

Diaphragm 30 is secured with its periphery sealed between the rim 24 and recess 28 of the flange and body, respectively, and extends across the housing to seal inlet 14 from outlet 11. The downstream surface of the diaphragm is supported by resilient snap over member 36 which bears against the outside undersurface of diaphragm 30. Preferably, the resilient snap over member 36 is a frusto-conical spring washer, although other shaped devices that function with a snap action retraction when moved past center are also suitable. The outside edge of member 36 is supported on annular shoulder 32.

Body 10 also supports diaphragm rupturing means such as punch 50 which is shown as a sleeve with an annular lip 51 that seats in a circular groove about the periphery of outlet 11. The upper edge of sleeve 50 is knife edges to facilitate rupturing of diaphragm 30 when the diaphragm is released against the punch by the resilient snap over member 36.

To permit use of the relief valve in low pressure systems where the system pressure is insufficient to rupture the diaphragm by punch 50, resilient snap over member 34 is provided. This member is mounted upstream of diaphragm 30 with its inner edge bearing against the diaphragm and its outer edge supported by shoulder 26 of flange 12. The member 34 is chosen to provide a force release when member 36 snaps over center. Generally, member 34 will be biased against member 36 as in the position shown in FIGURE 1. In a preferred embodiment, member 34 is snapped over center from the normal position of the member 36. The action of these members will be further discussed with reference to FIGURE 2.

The assembly is also provided with adjustable means for variation of the actuation pressure. This is an optional feature which permits precise setting of the relief pressure and thus permits a greater manufacturing tolerance. The adjustable means are also desirable in that they permit a varied range of relief pressures for a single assembly. The adjustable means shown in FIGURE 1 comprises the annular ring 38 which serves as a stop for the inside edge of resilient member 34. Ring 38 has an annular shoulder 39 and fits into central bore 42 of flange 12 with shoulder 39 seating in counterbore 43 of flange 12. Set screws 40 are placed in tapped bores along the periphery of bore 42 and these screws project beneath the lip between bore 42 and counterbore 43 and bear against shoulder 39 of ring 38. Advance or retraction of screws 40 thereby provides for axial displacement of ring 38 which is biased against screws 40 by the resilient member 36.

FIGURE 2 illustrates the force-displacement relationships of the resilient members 34 and 36. Curve I is a plot of force versus displacement for member 36 while Curve II is a plot of force versus displacement for member 34. Curve III is the additive curve and depicts the net force-displacement relationship of the assembly. The vertical line at point S along the displacement axis represents the position of ring 38 which sets the actuation pressure of the device. At point S, member 36 exhibits a positive force against the system pressure which is represented by point A, e.g., 8.5 p.s.i. Member 34 exhibits a negative force of about the equivalent of 5.0 p.s.i. which is shown at point B. The net pressure on the diaphragm 30 is shown as C on the additive curve at about 3.5 p.s.i. which is the required gauge pressure of the system for actuation of the relief valve. When the system pressure exceeds this pressure, the members 34 and 36 are deflected downstream, decreasing their force against the system pressure and releasing the diaphragm in a snap action. The system pressure, e.g. 3.5 p.s.i. is often inadequate to insure rupture of the diaphragm against the punch. The purpose of this invention is to provide member 34 which will force the diaphragm to rupture against the punch and this is also shown in FIGURE 2 at point P. Point P represents the position of punch 50 in the assembly. At this position, member 36 still exhibits a positive pressure of about 2 p.s.i. so that the net system pressure that is available to thrust the diaphragm against the punch is only about 1.5 p.s.i. Rupture of the diaphragm is nevertheless assured by the force exerted by the snap action of member 36, shown at point E as exerting a force of about 11 p.s.i. The net force exerted by the members 34 and 36 is shown at D as about 9 p.s.i., which, with the system pressure, provides a force of the equivalent of 12.5 p.s.i. for the rupture of the diaphragm.

Referring now to FIGURE 3, an alternative means for adjustment of the actuation pressure is shown. The means can be adjusted from the downstream side of the assembly in contrast to that shown in FIGURE 1 which is adjusted from the upstream side. In this construction, the valve has a flange 52 with a shoulder 56 which engages against rim 58 of body 60. The diaphragm 30 is secured between these surfaces. Cap screws 13 are provided about the periphery of the assembly to secure the flange to body 60. An annular rim 62 is slidably mounted inside the bore 64 in body 60 and on the inner periphery of rim 62 the punch means is secured with screws 68. A second rim 70 is positioned downstream of rim 62 and this rim 70 is provided with a plurality of tapped bores in which are inserted set screws 72. The inner wall of body 60 has a peripheral groove 74 in which ring 76 is inserted. Ring 74 serves as a seat for rim 70. The axial position of rim 62 can be adjusted from the downstream side of diaphragm 30 by the advance or retraction of set screws 72. The upstream face of rim 62 has an annular shoulder 80 which bears against and supports the base of resilient snap over member 82 which supports diaphragm 30 in axial spacing away from punch 66. The force or thrusting snap over member 84 rests downstream of diaphragm 30 with its inner edge biased against the diaphragm and its outer edge biased against shoulder 86 on the downstream face of flange 52. A ring 88 can be positioned about the inner edge of member 82 to support diaphragm 30. The setting of the relief pressure can be made from the downstream side of the assembly and can be made on the device after installation.

I claim:

1. A rupture disc device comprising a housing having an inlet and an outlet, a rupture disc mounted in said housing and extending across said housing between said inlet and outlet to close the same with the periphery of said disc being mounted between a first and a second resilient snap over member, punch means supported in said housing downstream of and in axial proximity to said disc so as to be engaged by said disc in its downstream position, said first resilient snap over member supported about its outer edges in said housing downstream of and biased against said disc and adapted to snap over center to a recessed downstream position when the upstream pressure exceeds a set pressure, a said second resilient snap over member supported about its outer edges in said housing upstream of said disc and in opposed alignment to said first snap over member and adapted to snap over center to an extended downstream position when the upstream pressure exceeds said set pressure and to thrust said disc against said punch means.

2. The device of claim 1 wherein adjustment means are provided to support one of the inner and outer edges of said resilient snap over members and wherein said adjustment means can deflect said members toward their snap over positions whereby to preload the members.

3. The device of claim 2 wherein said adjustment means are located upstream of said disc.

4. The device of claim 2 wherein said adjustment means are located downstream of said disc.

5. The device of claim 1 wherein said resilient members are frusto-conical washers.

6. The device of claim 1 wherein the housing comprises a first flange with a central bore defining said inlet and bearing a first annular rim about its periphery, a second flange with a central bore defining said outlet and bearing a second annular rim about its periphery, an annular recess in said second rim with said first and second flanges in opposed fit with said first rim seated in said annular recess of said second rim to define an annular chamber between said first and second flanges surrounding said outlet and said inlet; and wherein said first and second resilient snap over members are contained within said annular chamber.

7. The device of claim 6 wherein said disc extends annularly between said rims and wherein annular shoulders are provided about the inner periphery of each of said first and second rims with the second resilient snap over member seated against the shoulder of said first rim and the first resilient snap over member seated against the shoulder of said second rim.

8. The device of claim 7 wherein an annular ring is mounted about the periphery of said inlet to bear against the inner edges of said second resilient snap over member with adjustment means on said ring permitting variation in the axial position of said ring whereby to preload said resilient snap over members.

9. The device of claim 7 wherein the annular shoulder about the periphery of the second rim is supported on an annular ring that is slidably mounted on said second flange in an axial direction and adjustment means on said ring permitting variation in the axial position of said ring whereby to preload said resilient snap over members.

10. The device of claim 6 wherein said punch means comprises a sleeve having a knife edge directed upstream and mounted about the periphery of said outlet.

References Cited

UNITED STATES PATENTS 3,330,440  7/1967  Summers et al.

RAPHAEL H. SCHWARTZ, Primary Examiner